United States Patent
Itagaki et al.

(10) Patent No.: US 10,443,647 B2
(45) Date of Patent: Oct. 15, 2019

(54) POWER TRANSMISSION SHAFT

(71) Applicant: NTN CORPORATION, Osaka (JP)

(72) Inventors: Taku Itagaki, Shizuoka (JP); Yuichi Asano, Shizuoka (JP); Tomoshige Kobayashi, Shizuoka (JP); Takeyoshi Konomoto, Shizuoka (JP); Minoru Ishijima, Shizuoka (JP)

(73) Assignee: NTN CORPORATION, Osaka (JP)

( * ) Notice: Subject to any disclaimer, the term of this patent is extended or adjusted under 35 U.S.C. 154(b) by 265 days.

(21) Appl. No.: 15/520,912

(22) PCT Filed: Nov. 2, 2015

(86) PCT No.: PCT/JP2015/080883
§ 371 (c)(1),
(2) Date: Apr. 21, 2017

(87) PCT Pub. No.: WO2016/080178
PCT Pub. Date: May 26, 2016

(65) Prior Publication Data
US 2017/0335883 A1 Nov. 23, 2017

(30) Foreign Application Priority Data
Nov. 17, 2014 (JP) ................................. 2014-232719

(51) Int. Cl.
*F16C 3/02* (2006.01)
(52) U.S. Cl.
CPC ................ *F16C 3/02* (2013.01); *F16C 3/026* (2013.01); *F16C 2204/00* (2013.01); *F16C 2208/02* (2013.01); *Y10T 403/7045* (2015.01)
(58) Field of Classification Search
CPC ........ F16C 3/02; F16C 3/026; F16C 2204/00; F16C 2208/02; Y10T 403/7045
(Continued)

(56) References Cited

U.S. PATENT DOCUMENTS 6,352,385 B1   3/2002 Wojciechowski et al.
6,855,061 B2 * 2/2005 Simboli .................. F16D 1/068
                                                        464/182
(Continued)

FOREIGN PATENT DOCUMENTS

JP      55-142718    10/1980
JP      62-13230     1/1987
(Continued)

OTHER PUBLICATIONS

International Search Report dated Feb. 2, 2016 in International (PCT) Application No. PCT/JP2015/080883.
(Continued)

*Primary Examiner* — Greg Binda
(74) *Attorney, Agent, or Firm* — Wenderoth, Lind & Ponack, L.L.P.

(57) ABSTRACT

A corrugated portion is formed in one end edge portion of the metallic shaft main body (2), and a triangular corrugated portion (11) is formed in an end edge portion of the shaft auxiliary body (3) on the metallic shaft main body side. The metallic shaft main body (2) and the shaft auxiliary body (3) are integrated by being linearly arranged by way of meshing that brings a side of the triangular corrugated portion (9) on the main body side and a side of the triangular corrugated portion (11) on the auxiliary body side into contact with each other. A fiber orientation angle (θ) of the fiber reinforced plastic of the shaft auxiliary body (3) is set so as to be in the same direction as a direction of stress generated in a hypotenuse of each triangular portion under a torque load state.

17 Claims, 13 Drawing Sheets

(58) Field of Classification Search
USPC .................................................. 464/181, 182
See application file for complete search history.

(56) References Cited

U.S. PATENT DOCUMENTS

2002/0117228 A1   8/2002   Nakajima et al.
2012/0184383 A1   7/2012   Buchin

FOREIGN PATENT DOCUMENTS

| JP | 1-91118 | 6/1989 |
| JP | 1-154730 | 6/1989 |
| JP | 4-163130 | 6/1992 |
| JP | 2002-89580 | 3/2002 |
| JP | 2002-235726 | 8/2002 |
| JP | 2004-308700 | 11/2004 |
| JP | 2011-052720 | 3/2011 |

OTHER PUBLICATIONS

Office Action dated Dec. 4, 2018 in corresponding Japanese Application No. 2014-232719 with English-language translation.

\* cited by examiner

POWER TRANSMISSION SHAFT

TECHNICAL FIELD

The present invention relates to a power transmission shaft, and more particularly, to a power transmission shaft used in automobiles and various industrial machines.

BACKGROUND ART

A power transmission shaft used in automobiles and various industrial machines is generally made of steel. However, the power transmission shaft made of steel is heavy. Therefore, in recent years, in order to reduce the weight, fiber reinforced plastic, such as carbon fiber reinforced plastic (CFRP), is used in some cases.

When the fiber reinforced plastic is used as described above, an iron and steel member is used together in order to prevent decrease in strength. Therefore, it is necessary to join the fiber reinforced plastic and the iron and steel member to each other, and a joining property between the fiber reinforced plastic and the iron and steel member has hitherto been taken into consideration (Patent Literatures 1 to 3).

In Patent Literature 1, a tube body made of fiber reinforced plastic (FRP) is joined to a metallic yoke in an end portion of the tube body through intermediation of a rivet. In this case, the tube body made of FRP is formed of a right angle winding layer in which fibers are wound so that an orientation angle thereof is substantially a right angle with respect to a center axis. In the end portion, an acute angle winding layer in which fibers are wound so that an orientation angle thereof is an acute angle with respect to the center axis and the right angle winding layer are alternately arranged.

In Patent Literature 2, an end portion of a tubular body made of FRP includes a helical winding layer in which an orientation angle of fibers is set to less than 45° with respect to a center axis and a hoop winding layer interposed in the helical winding layer. The orientation angle of fibers of the hoop winding layer is set to 45° or more and less than 90°. An intermediate cylindrical member formed of a metal plate is press-fitted into the end portion, and further, a press-fitting shaft portion of a metallic yoke is fitted into the intermediate cylindrical member.

In this case, serrations are formed on a radially outer surface and a radially inner surface of the intermediate cylindrical member. When the intermediate cylindrical member is press-fitted into the end portion of the tubular body made of FPR, the serration on the radially outer surface side cuts into the radially inner surface of the end portion of the tubular body made of FRP. Further, when the press-fitting shaft portion of the metallic yoke is fitted into the intermediate cylindrical member, the serration formed on the radially outer surface of the press-fitting shaft portion of the metallic yoke is meshed with the serration on the radially inner surface. With this, the metallic yoke is joined to the tubular body made of FRP.

In Patent Literature 3, there is disclosed a FRP drive shaft in which metallic end portion joints are coupled to both end portions of an FRP cylinder. In this case, the end portion joint includes a serration shaft member and a large-diameter flange member coupled to the serration shaft member. A metallic butt collar formed of a short cylindrical body including a corrugated engagement portion is externally fitted onto the serration shaft member, and the end portion of the FRP cylinder is fitted into the serration shaft member in an outer fitting shape.

Further, a corrugated engagement portion is formed in the end portion of the FRP cylinder, and the corrugated engagement portions are fitted with each other under a state in which the corrugated engagement portion of the butt collar is brought into abutment against the corrugated engagement portion formed in the end portion of the FRP cylinder. Then, the collar formed of the short cylindrical body is externally fitted onto the fitting site of the corrugated engagement portion. In this case, the corrugated engagement portion of the FRP cylinder and the corrugated engagement portion of the collar are fitted with each other, and in this state, the collar is externally fitted to adhere onto the fitting site of the corrugated engagement portion. The FRP cylinder and the butt collar, which are integrated, are press-fitted into the serration shaft member.

CITATION LIST

Patent Literature 1: JP 1-91118 U
Patent Literature 2: JP 2004-308700 A
Patent Literature 3: JP 2011-52720 A

SUMMARY OF INVENTION

Technical Problem

In Patent Literature 1, as described above, the metallic yoke is fitted into the end portion of the tube body made of FRP, and the metallic yoke and the end portion are connected to each other through use of a rivet. Therefore, stress is concentrated on a rivet through-site at a time of torque load or the like, and there is a risk in that the rivet through-site may be broken at a time of generation of a relative low torque. Further, due to the use of the rivet, it cannot be said that an assembly property and a matching property are excellent.

In Patent Literature 2, the serration on the radially outer surface side of the intermediate cylindrical member cuts into the radially inner surface of the end portion of the tubular body made of FRP, and there is a risk in that the fibers on the radially inner surface side of the tubular body made of FRP may be cut due to the cutting-in of the radially inner surface. Therefore, peeling is liable to occur between fiber reinforced plastic (FRP) layers at a time of torque load.

In Patent Literature 3, the corrugated engagement portions are fitted with each other under a state in which the corrugated engagement portion of the butt collar is brought into abutment against the corrugated engagement portion in the end portion of the FRP cylinder. However, also in this case, the serration of the serration shaft member cuts into the radially inner surface of the corrugated engagement portion in the end portion of the FRP cylinder. Therefore, in the same way as in Patent Literature 2, there is a risk in that the fibers on the radially inner surface side of the FRP cylinder may be cut. Further, there is no limitation on the fiber orientation direction of the FRP cylinder. Therefore, there is a risk in that the fibers may receive a force in a shear direction at a time of torque load, and thus the strength is not stable.

In view of the foregoing, according to the present invention, there is provided a power transmission shaft, in which the torsional strength of the fiber reinforced plastic can be kept at a high level and which can be reduced in weight.

Solution to Problems

According to one embodiment of the present invention, there is provided a power transmission shaft, comprising: a metallic shaft main body; and a shaft auxiliary body made of fiber reinforced plastic connected to the metallic shaft main body, the fiber reinforced plastic of the shaft auxiliary body including fibers having orientation, wherein the metallic shaft main body has a triangular corrugated portion, in which a plurality of triangular portions are arranged in a circumferential direction of the power transmission shaft, formed in one end edge portion, wherein the shaft auxiliary body has a triangular corrugated portion, in which a plurality of triangular portions are arranged in the circumferential direction, formed in an end edge portion on the metallic shaft main body side, wherein the metallic shaft main body and the shaft auxiliary body are integrated by being linearly arranged by way of meshing that brings a side of the triangular corrugated portion on the metallic shaft main body side and a side of the triangular corrugated portion on the shaft auxiliary body side into contact with each other under a state in which the one end edge portion of the metallic shaft main body and the end edge portion of the shaft auxiliary body on the metallic shaft main body side are brought into abutment against each other, and wherein a fiber orientation angle of the fiber reinforced plastic of the shaft auxiliary body is set so as to be in the same direction as a direction of stress generated in a hypotenuse of each of the triangular portions under a torque load state. In this case, the fiber orientation angle is set to preferably from 30° to 60° and from −30° to −60°, particularly preferably ±45°. When the fiber orientation angle is set to from 30° to 60° and from −30° to −60°, the angle formed by the hypotenuse of each of triangular portions of the triangular corrugated portion with respect to the shaft auxiliary body axial center is set to from 30° to 60° and from −30° to −60°.

In the power transmission shaft of the present invention, the torsional strength of the fiber reinforced plastic can be kept at a high level by setting the fiber orientation angle of the fiber reinforced plastic of the shaft auxiliary body to be in the same direction as the direction of stress generated in the hypotenuse of each of the triangular portions under the torque load state. Further, when the fiber orientation angle is set to from 30° to 60° (from −30° to −60°), an apex portion of the triangular portion forms a triangular shape of from about 60° to about 120°, and the strength based on the shape becomes stable by setting the angle formed by the hypotenuse of each of the triangular portions of the triangular corrugated portion with respect to the shaft auxiliary body axial center to from 30° to 60° (from −30° to −60°). That is, when the apex portion has an acute angle of about 60° or less, the apex portion has a so-called tapered shape, and the strength based on the shape does not become stable. In contrast, when the apex portion has an obtuse angle of 120°, the axial length of the fitting portion becomes small, and a stable torque transmission function is not easily exhibited.

It is preferred that the shaft auxiliary body have a cored bar internally fitted thereinto, and that the cored bar be joined to the metallic shaft main body.

A ring-shaped collar member may be externally fitted onto a meshing portion with which the triangular corrugated portion is meshed, a sheet material including fibers impregnated with a resin may be wound around the meshing portion, or a fiber body impregnated with a resin may be wound around the meshing portion. With this, the meshing portion with which the triangular corrugated portion is meshed can be prevented from being enlarged (increased in diameter) toward the radially outer side at a time of torque load.

The fiber reinforced plastic of the shaft auxiliary body may be impregnated with a large number of short fibers. The strength of the fiber reinforced plastic can be increased by impregnating the fiber reinforced plastic with the large number of short fibers.

The metallic shaft main body may comprise a corrugated portion forming member configured to form the triangular corrugated portion on the one end edge portion side, in which the corrugated portion forming member, the meshing portion with which the triangular corrugated portion is meshed, and the shaft auxiliary body are covered with a protective pipe material.

Advantageous Effects of Invention

In the present invention, the torsional strength of the fiber reinforced plastic can be kept at a high level, and the strength based on the shape also becomes stable. Therefore, it is possible to provide the power transmission shaft, which can be reduced in weight and can effectively exhibit a torque transmission function.

When the cored bar is internally fitted into the shaft auxiliary body, the shaft auxiliary body can be prevented from being buckled, and the torsional strength is increased.

When the collar member or the like is externally fitted onto the meshing portion with which the triangular corrugated portion is meshed, the meshing portion can be prevented from being enlarged (increased in diameter) toward the radially outer side at a time of torque load. The joint strength can be prevented from decreasing. A stable torque transmission function can be exhibited over a long time period.

The strength of the fiber reinforced plastic can be increased by impregnating the fiber reinforced plastic with the large number of short fibers, and the power transmission shaft that is further excellent in durability can be provided.

When the shaft auxiliary body is covered with the protective pipe material, the protective pipe material can serve as the cored bar configured to reinforce the torsional strength on an outer peripheral side of the shaft auxiliary body, and the shaft auxiliary body can be protected from foreign matters, for example, flying stone, UV-rays, and the like from outside.

DESCRIPTION OF EMBODIMENTS

Figure 12:
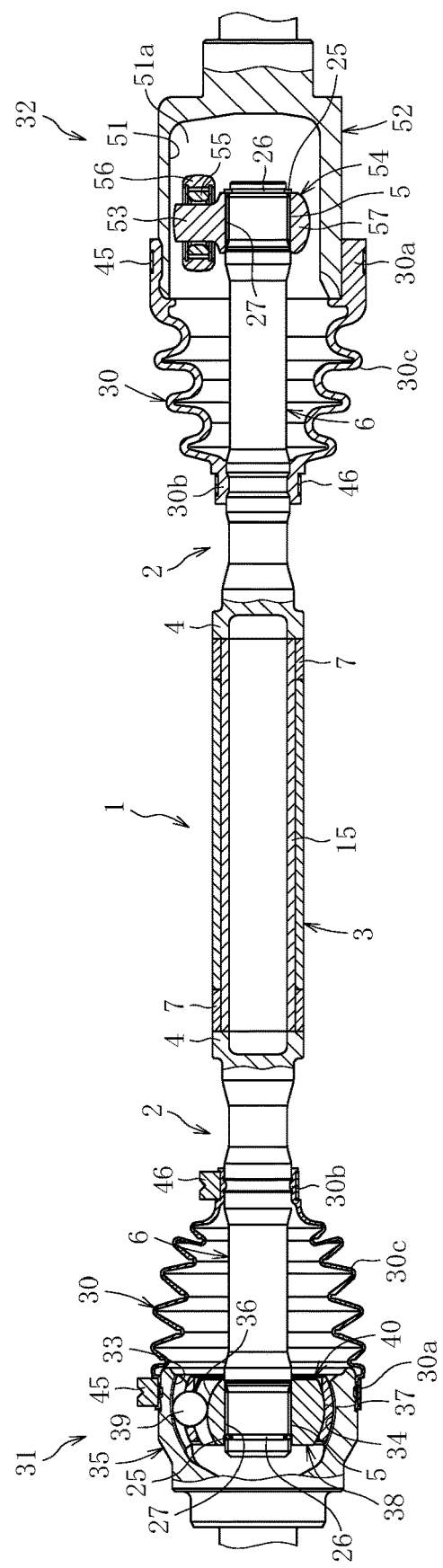
FIG. 12 is a sectional view of a drive shaft.

Now, embodiments of the present invention are described with reference to FIG. 1 to FIG. 12. A power transmission shaft is used in, for example, automobiles and various industrial machines, and as illustrated in FIG. 1 to FIG. 4, comprises a pair of metallic shaft main bodies 2 and a shaft auxiliary body 3 made of fiber reinforced plastic connected to the metallic shaft main body 2. FIG. 12 is a view for illustrating a drive shaft using a power transmission shaft 1.

The drive shaft is obtained by connecting a fixed type constant velocity universal joint 31 and a plunging type constant velocity universal joint 32 with the power transmission shaft 1 according to the present invention. In the illustrated example, a Barfield-type constant velocity universal joint is used as the fixed type constant velocity universal joint 31, and a tripod type constant velocity universal joint is used as the plunging type constant velocity universal joint 32.

The fixed type constant velocity universal joint 31 comprises an outer joint member 35 in which a plurality of track grooves 33 extending in an axial direction are formed on a radially inner surface 34, an inner joint member 38 in which a plurality of track grooves 36 extending in the axial direction are formed on a radially outer surface 37 at equal intervals in a circumferential direction, a plurality of balls 39 interposed between the track grooves 33 of the outer joint member 35 and the track grooves 36 of the inner joint member 38 and configured to transmit a torque, and a cage 40 interposed between the radially inner surface 34 of the outer joint member 35 and the radially outer surface 37 of the inner joint member 38 and configured to hold the balls 39.

The plunging type constant velocity universal joint 32 comprises an outer joint member 52 in which three track grooves 51 extending in an axial direction are arranged on an inner periphery and roller guide surfaces 51a opposed to each other are arranged on inner side walls of respective track grooves 51, a tripod member 54 comprising three leg shafts 53 protruding in a radial direction, an inner side roller 55 that is externally fitted onto the leg shaft 53, and an outer side roller 56 which is inserted into the track groove 51 and is externally fitted onto the inner side roller 55. That is, the plunging type constant velocity universal joint 32 is a double roller type in which the outer side roller 56 can freely rotate with respect to the leg shaft 53 and move along the roller guide surface 51a. Further, the tripod member 54 comprises a boss 57 and the leg shafts 53. The leg shafts 53 protrude in the radial direction from trisected positions in the circumferential direction of the boss 57.

An axial end fitting portion of the shaft 1 is fitted into a shaft hole of the inner joint member 38 in the fixed type constant velocity universal joint 31 so as to transmit a torque, and an axial end fitting portion of the shaft 1 is fitted into a shaft hole of the tripod member 54 in the plunging type constant velocity universal joint 32 so as to transmit a torque. End portions of both the axial end fitting portions of the shaft 1 are retained with retaining rings 25 and 25, such as snap rings, respectively. That is, circumferential grooves 26 and 26 are formed in the end portions of the axial end fitting portions, and the retaining rings 25 and 25 are fitted into the circumferential grooves 26 and 26.

Male splines 5 and 5 are formed on an outer diameter of each axial end fitting portion of the shaft 1, and female splines 27 and 27 are formed in the shaft holes of the inner joint member 38 and the tripod member 54 of both the constant velocity universal joints. The axial end fitting portions of the shaft 1 are fitted into the shaft holes of the inner joint member 38 and the tripod member 54 of the constant velocity universal joints 31 and 32, to thereby mesh and couple the male splines 5 and 5 and the female splines 27 and 27 with each other, with the result that a torque can be transmitted between the shaft 1 and the inner joint member 38 and between the shaft 1 and the tripod member 54.

Boots 30, which are configured to prevent penetration of foreign matters from outside and leakage of grease from inside, are mounted between the shaft 1 and the outer joint members 38 and 52, respectively. The boot 30 comprises a large-diameter end portion 30a, a small-diameter end portion 30b, and a bellows portion 30c configured to connect the large-diameter end portion 30a and the small-diameter end portion 30b to each other. The large-diameter end portions 30a of the boots 30 are fastened to be fixed at opening ends of the outer joint members 35 and 52 with boot bands 45, and the small-diameter end portions 30b are fastened to be fixed at predetermined sites of the shaft 1 with boot bands 46.

A metallic shaft main body 2 comprises a stub shaft 6 in which a large-diameter portion 4 is arranged in one end portion and the male spline 5 is arranged in the other end portion, and a corrugated portion forming member 7 connected to the large-diameter portion 4 of the stub shaft 6.

Figure 3:
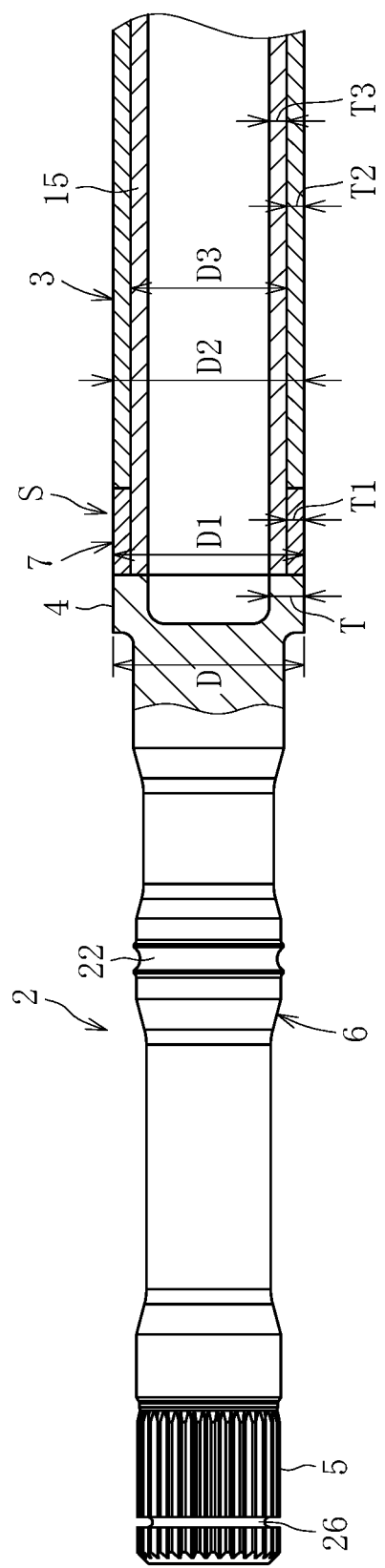
FIG. 3 is a plan view for illustrating a cross-section of relevant parts in an assembled state of the power transmission shaft illustrated in FIG. 1.

The corrugated portion forming member 7 is formed of a short cylindrical body, and in one end portion of the corrugated portion forming member 7, a triangular corrugated portion 9 in which a plurality of triangular portions 8 are arranged in the circumferential direction is formed. In this case, as illustrated in FIG. 3, an outer diameter dimension D1 of the corrugated portion forming member 7 and an outer diameter dimension D of the large-diameter portion 4 of the stub shaft 6 are set to the same dimension. Further, a thickness T1 of the corrugated portion forming member 7 is set to about a half of a thickness T of the large-diameter portion 4, and the other end surface of the corrugated portion forming member 7 and an outer end surface of the large-diameter portion 4 of the stub shaft 6 are brought into abutment against each other to be joined (welded) to each other.

As the stub shaft 6 and the corrugated portion forming member 7, for example, steel for machine structural use typified by C53C and S43C, 10B38 in which quenching depth and strength are increased by adding boron, and the like may be used. Further, in the stub shaft 6, it is preferred that the constant velocity joint joining site including the male spline 5 be subjected to thermosetting treatment to ensure strength. In the stub shaft 6, it is preferred that a site to be joined to the corrugated portion forming member 7 be subjected to thermosetting treatment to ensure strength. However, when the outer diameter dimension of the site to be joined to the corrugated portion forming member 7 can be set to be relatively large to ensure strength, the site to be joined to the corrugated portion forming member 7 may not be subjected to thermosetting treatment.

As the thermosetting treatment, there are given induction heat treatment, carburizing heat treatment, and the like. When the thermosetting treatment is performed, it is preferred that surface hardness be set to from 52 HRC to 65 HRC. Further, it is preferred that the thickness T1 of the corrugated portion forming member 7 be set to from about 5 mm to about 10 mm.

The shaft auxiliary body 3 is formed by, for example, a filament winding method. Here, the filament winding method refers to a method involving winding and forming reinforced fibers impregnated with a resin around a mandrel (mold having a hollow cylindrical shape) and hardening the resultant in a heating hardening furnace, to thereby provide a completed product. There are a system of rotating a mandrel side and a system of rotating a winding head called a creel.

Figure 1:
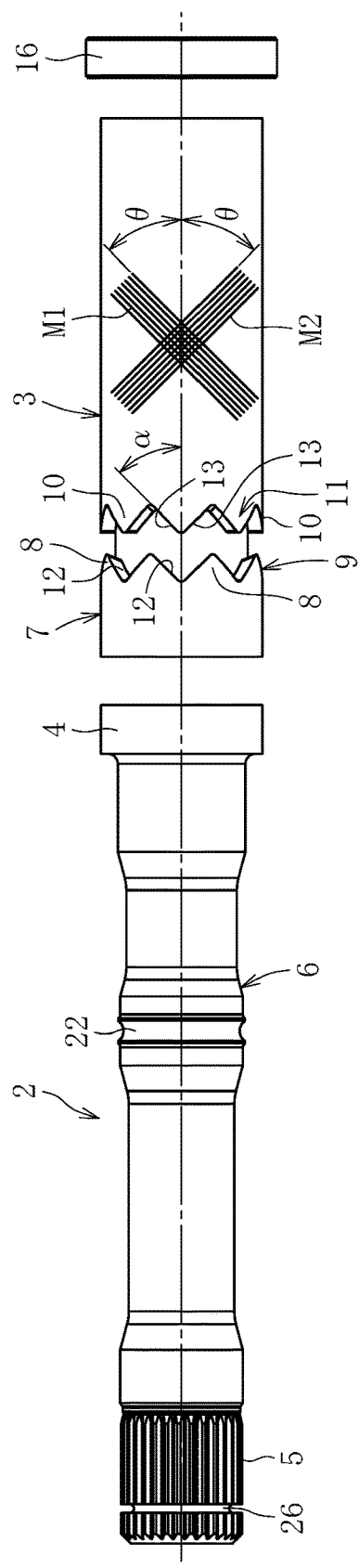
FIG. 1 is a plan view for illustrating a disassembled state of a power transmission shaft of the present invention.
Figure 2:
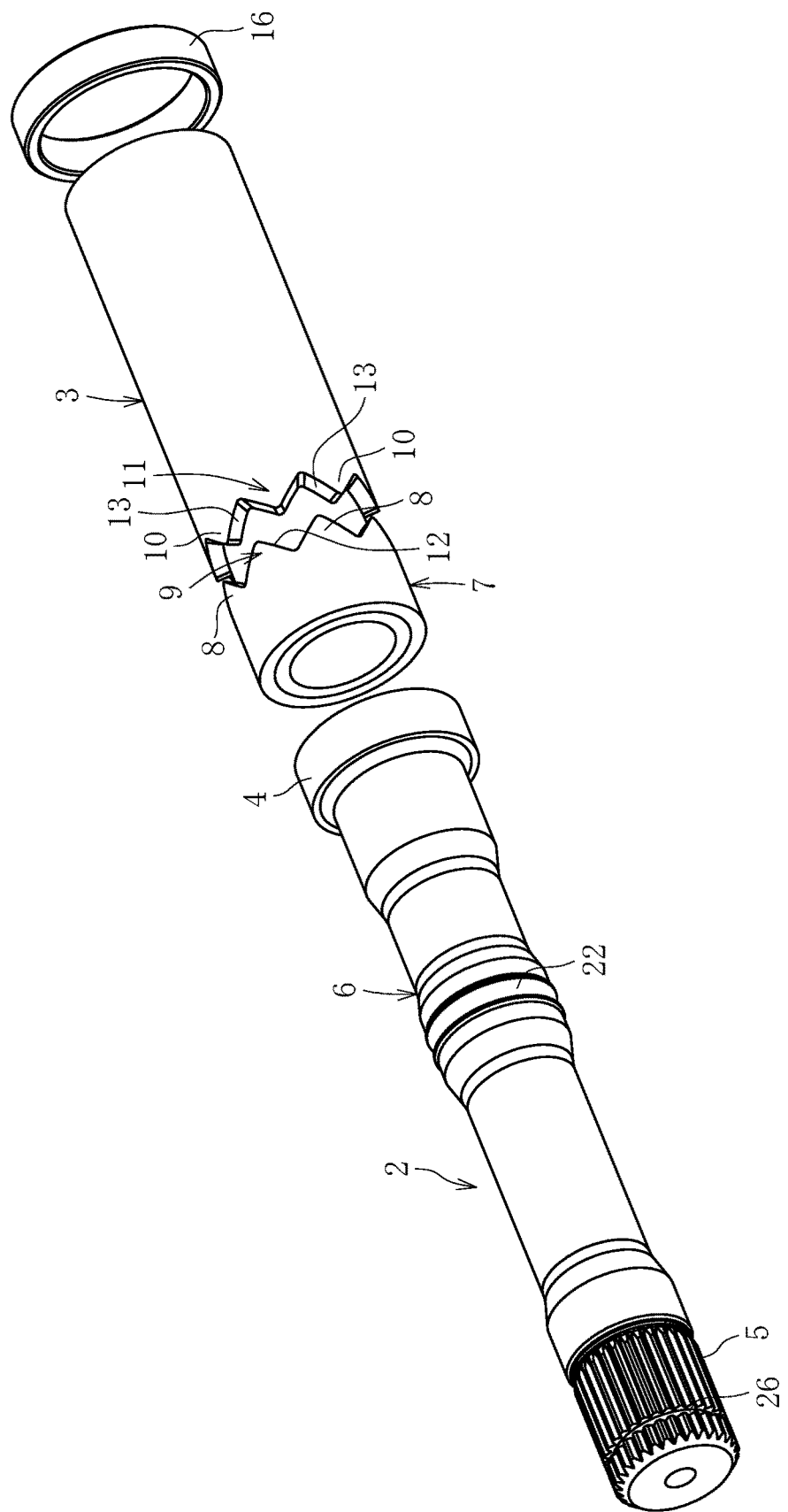
FIG. 2 is a perspective view for illustrating the disassembled state of the power transmission shaft illustrated in FIG. 1.

Therefore, in the shaft auxiliary body 3, as illustrated in FIG. 1, the fiber reinforced plastic includes fibers having orientation and comprises a first fiber winding portion M1 having a fiber orientation angle $\theta$ of +45° and a second fiber winding portion M2 having a fiber orientation angle $\theta$ of −45°.

Figure 5:
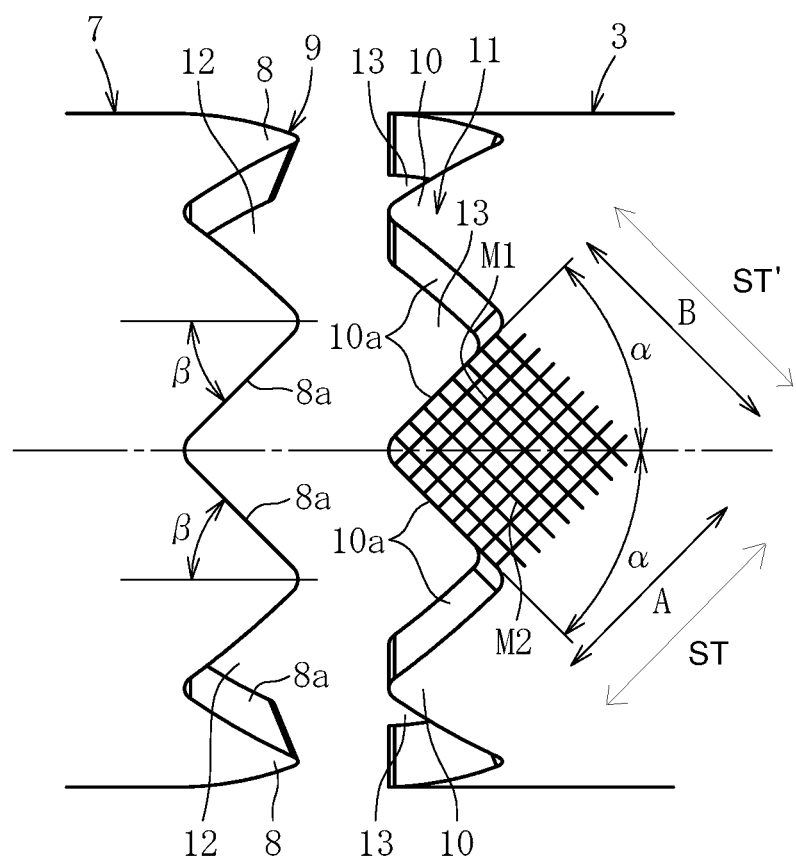
FIG. 5 is an enlarged plan view of a meshing portion with which a triangular corrugated portion is meshed in the power transmission shaft illustrated in FIG. 1.

In the end portion of the shaft auxiliary body 3 on the corrugated portion forming member 7 side, a triangular corrugated portion 11 in which a plurality of triangular portions 10 are arranged in the circumferential direction is formed. In this case, as illustrated in FIG. 5, the triangular portion 10 forms, in a plan view, an isosceles triangle in which an angle a formed by a hypotenuse 10a with respect to the shaft axial center is 45°. An apex portion of the triangular portion 10 has a round shape.

Further, the triangular portion 8 of the triangular corrugated portion 9 of the corrugated portion forming member 7 also forms, in a plan view, an isosceles triangle in which an angle $\beta$ formed by a hypotenuse 8a with respect to the shaft axial center is 45° in the same manner as in the triangular corrugated portion 11. A thickness T2 of the shaft auxiliary body 3 and the thickness T1 of the corrugated portion forming member 7 are set to the same thickness.

In this case, when the outer diameter dimension of the large-diameter portion 4 of the shaft main body 2 is represented by D, the outer diameter dimension of the corrugated portion forming member 7 is represented by D1, and an outer diameter dimension of the shaft auxiliary body 3 is represented by D2, a relationship D=D1=D2 is satisfied. An outer diameter dimension D3 of a cored bar 15 described later is set to be the same as an inner diameter dimension of the corrugated portion forming member 7 and an inner diameter dimension of the shaft auxiliary body 3.

The triangular portions 8 of the corrugated portion forming member 7 on a shaft auxiliary body side and the triangular portions 10 of the shaft auxiliary body 3 on a metallic shaft main body side are arranged with the same shape dimension at the same pitch in the circumferential direction. Therefore, the triangular portions 10 of the shaft auxiliary body 3 are fitted into triangular recessed portions 12 formed between the triangular portions 8 adjacent to each other in the circumferential direction of the corrugated portion forming member 7, and the triangular portions 8 of the corrugated portion forming member 7 are fitted into triangular recessed portions 13 formed between the triangular portions 10 adjacent to each other in the circumferential direction of the shaft auxiliary body 3 such that end surfaces of the triangular portions 8 of the corrugated portion forming member 7 and end surfaces of the triangular portions 10 of the shaft auxiliary body 3 contact each other. That is, the triangular corrugated portion 9 of the corrugated portion forming member 7 and the triangular corrugated portion 11 of the shaft auxiliary body 3 are meshed with each other.

In this case, as illustrated in FIG. 5, the angles $\alpha$ and $\beta$ of the hypotenuse 10a of the triangular portion 10 of the shaft auxiliary body 3 and the hypotenuse 8a of the triangular portion 8 of the corrugated portion forming member 7 are 45°. The fiber orientation angle $\theta$ of the first fiber winding portion, which is wound with the fibers in an A direction, of the shaft auxiliary body 3 is +45°. The fiber orientation angle $\theta$ of the second fiber winding portion, which is wound with the fibers in a B direction, is −45°. Therefore, the direction of stress ST, ST' generated at a time of torque load and the direction of the fibers are the same.

Incidentally, the fiber orientation angle $\theta$ of the first fiber winding portion, that is, the fibers in the A direction of the shaft auxiliary body 3 is not limited to +45°, and may be from +30° to +60°. The fiber orientation angle $\theta$ of the second fiber winding portion, that is, the fibers in the B direction may be from −30° to −60°. Therefore, the angles $\alpha$ and $\beta$ of the hypotenuse of the triangular portion 10 of the shaft auxiliary body 3 and the hypotenuse of the triangular portion 8 of the corrugated portion forming member 7 are not limited to 45°, and may be from 30° to 60°. That is, it is only necessary that the direction of stress generated at a time of torque load and the direction of the fibers be set to the same direction.

Further, the resin of the shaft auxiliary body 3 may be a thermosetting resin, such as an epoxy resin, or a thermoplastic resin, such as nylon (PA), polypropylene (PP), and polyether ketone (PEEK).

The fiber reinforced plastic may be obtained as follows. When fibers are previously impregnated with a resin layer so as to pass through the resin layer, an indefinite number of short fibers are impregnated into the resin layer with stirring, to thereby cause the short fibers to adhere to the fibers, specifically, the first fibers M1 and the second fibers M2 to be wound. With this, the indefinite number of short fibers, as well as the wound long fibers are contained in the hardened resin. The fiber length of the short fibers is less than 1 mm.

As illustrated in FIG. 3, the cored bar 15 formed of a pipe material is internally fitted into the shaft auxiliary body 3. As the cored bar 15, for example, steel for machine structural use typified by C53C and S43C, 10B38 in which quenching depth and strength are increased by adding boron, and the like may be used in the same manner as in the shaft main body and the like. Also in this case, it is preferred that the cored bar 15 be subjected to thermosetting treatment to ensure strength. However, when the outer diameter dimension of the cored bar 15 can be set to be relatively large to ensure strength, the cored bar 15 may not be subjected to thermosetting treatment. When the cored bar 15 is subjected to thermosetting treatment, the surface hardness is set to from 52 HRC to 65 HRC.

A thickness T3 of the cored bar 15 in this case is set to be the same as the thickness T1 of the corrugated portion forming member 7. Further, an end surface of the cored bar 15 on the shaft main body side and an end surface of the large-diameter portion 4 of the shaft main body are joined (welded) to each other. Thus, the corrugated portion forming member 7 and the end portion of the cored bar 15 are superimposed on one another under the joined state, and a thickness (T1+T3) of the superimposed portion and a thickness of the large-diameter portion 4 of the shaft main body become the same. When the end surface of the cored bar 15 on the shaft main body side and the end surface of the large-diameter portion 4 of the shaft main body are joined to each other, the end surface of the corrugated portion forming member 7 and the end surface of the large-diameter portion 4 of the shaft main body are joined to each other. Therefore, under those joined states, the shaft auxiliary body 3 is externally fitted onto the cored bar 15, and the triangular corrugated portion 9 of the corrugated portion forming member 7 and the triangular corrugated portion 11 of the shaft auxiliary body 3 are meshed with each other. Further, the thickness (T1+T3) of the superimposed portion of the corrugated portion forming member 7 and the end portion of the cored bar 15 and a thickness (T2+T3) of the superimposed portion of the cored bar 15 and the shaft auxiliary body 3 are set to the same thickness.

Figure 4:
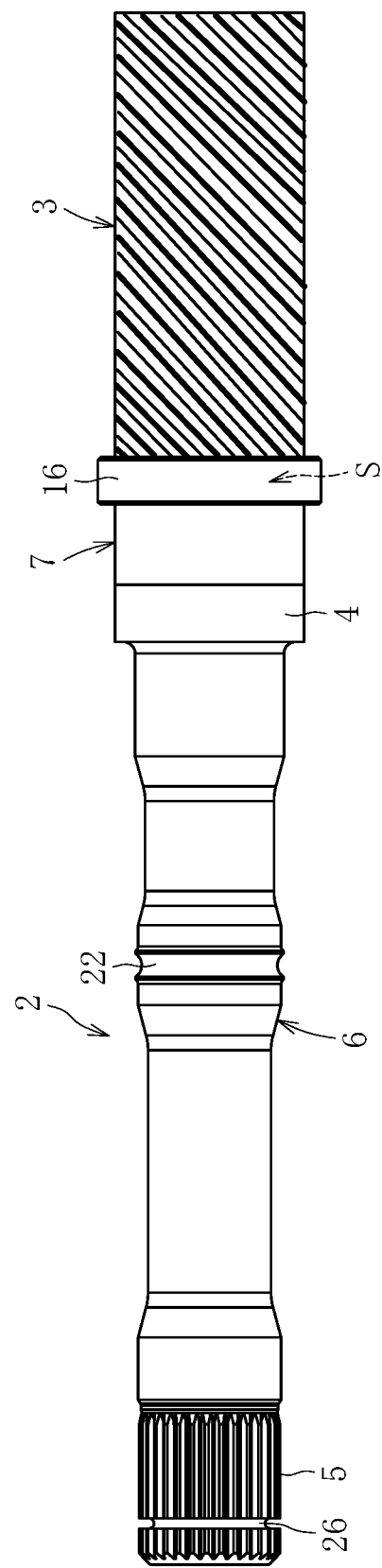
FIG. 4 is a plan view of the assembled state of the power transmission shaft illustrated in FIG. 1.

As illustrated in FIG. 4, a collar member 16 formed of a short cylindrical body is externally fitted onto a meshing portion S between the triangular corrugated portion 9 of the corrugated portion forming member 7 and the triangular portions 10 of the shaft auxiliary body 3. As the collar member 16, for example, steel for machine structural use typified by C53C and S43C, 10B38 in which quenching depth and strength are increased by adding boron, and the like may be used. Further, alloy steel, such as stainless steel, may be used, and for the purpose of reducing weight, a non-iron metal, such as an aluminum alloy, or a resin may also be used.

When the collar member 16 is press-fitted onto the meshing portion between the triangular corrugated portion 9 of the corrugated portion forming member 7 and the triangular corrugated portion 11 of the shaft auxiliary body 3, the collar member 16 covers the meshing portion S. Further, the collar member 16 is not a member configured to transmit a torque. Therefore, even when the collar member 16 is made of metal, it is not necessary to subject the collar member 16 to thermosetting treatment. However, needless to say, the collar member 16 may be subjected to thermosetting treatment. When the collar member 16 is subjected to thermosetting treatment, the surface hardness is set to from 52 HRC to 65 HRC. The thickness of the collar member 16 is set to, for example, from about 5 mm to about 10 mm.

Figure 6:
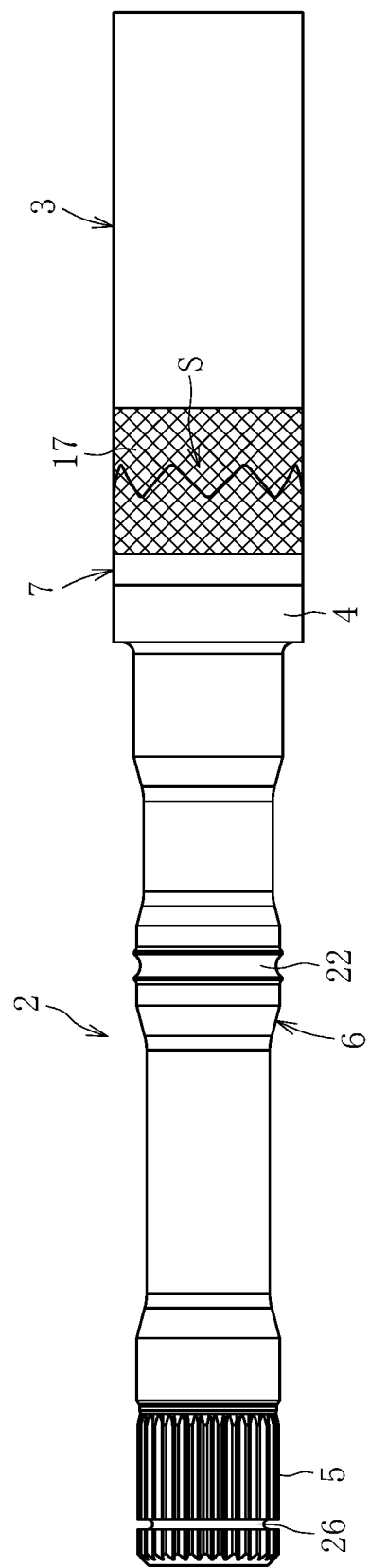
FIG. 6 is a plan view of the power transmission shaft in which a sheet including fibers having a fiber orientation angle of 45° impregnated with a resin is wound around the meshing portion.
Figure 7:
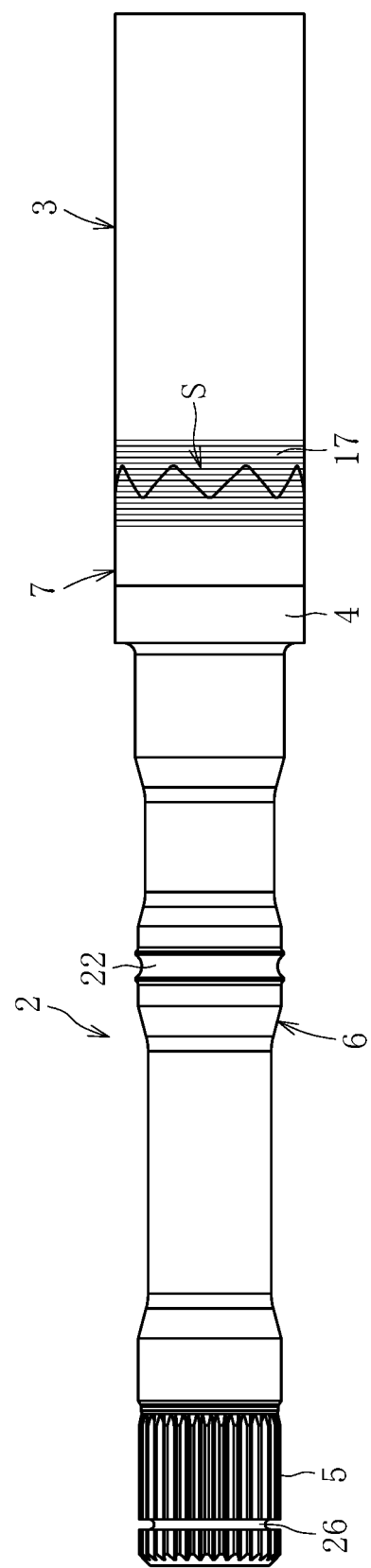
FIG. 7 is a plan view of the power transmission shaft in which a sheet including fibers having a fiber orientation angle of 90° impregnated with a resin is wound around the meshing portion.
Figure 8:
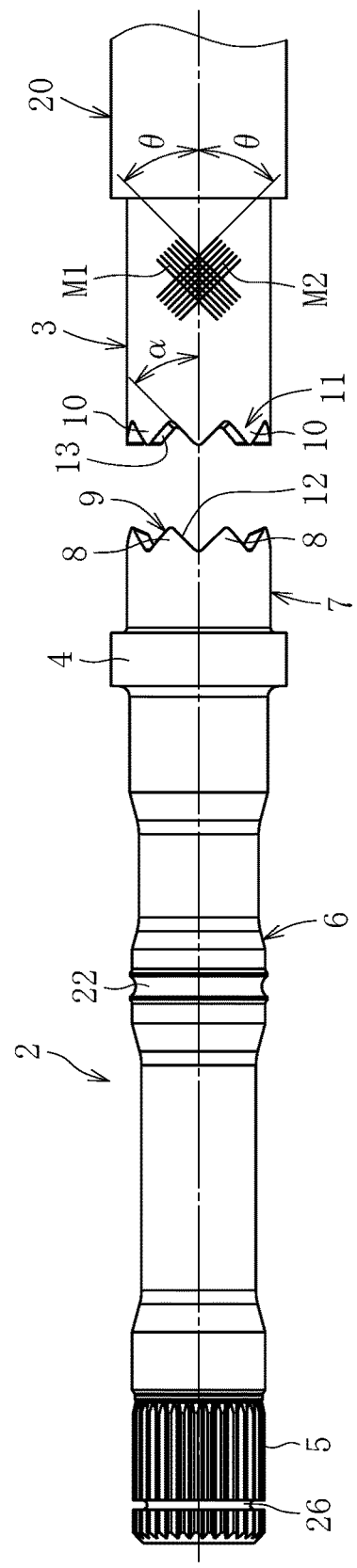
FIG. 8 is a plan view of a separated state of a power transmission shaft according to another embodiment of the present invention.
Figure 9:
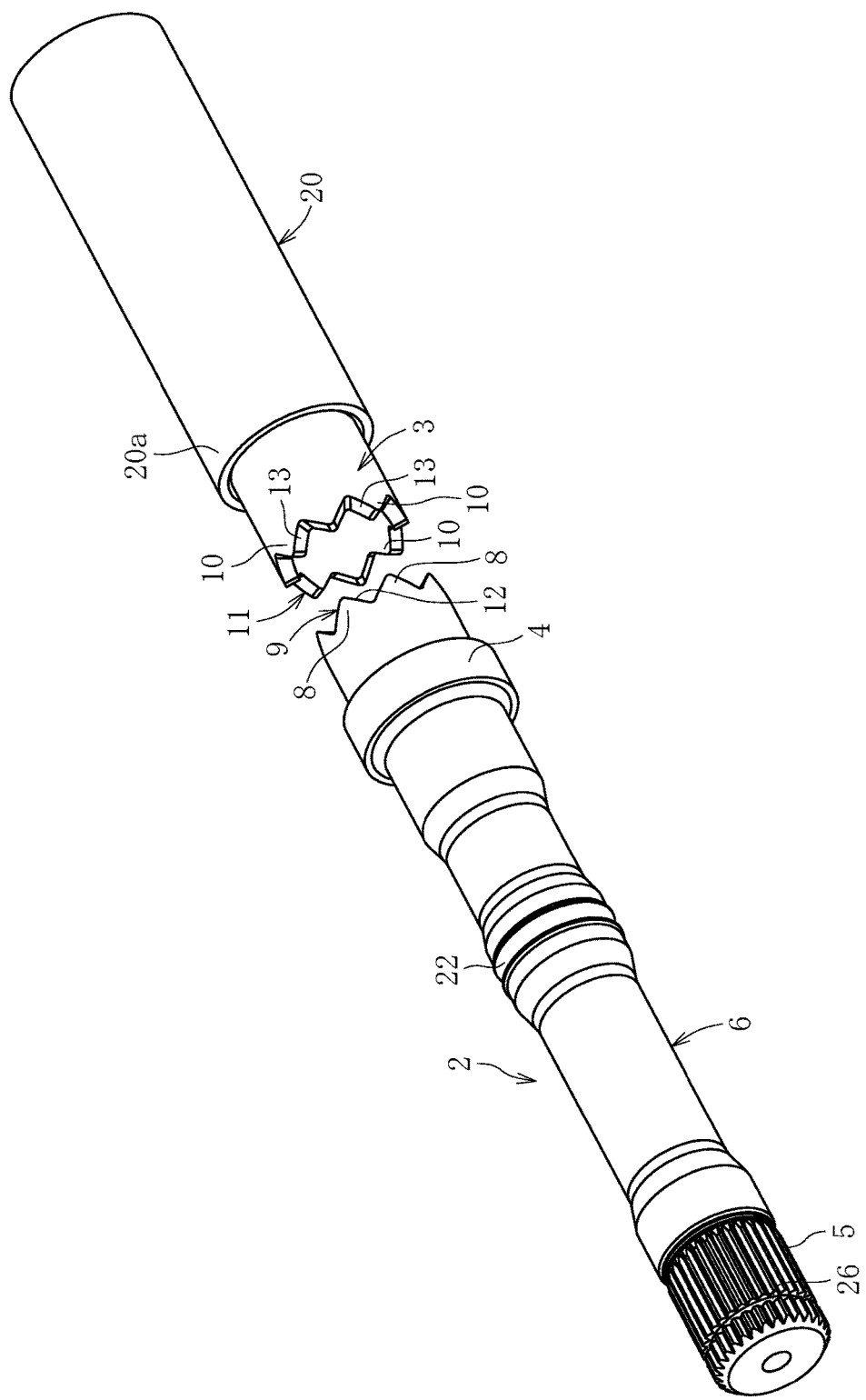
FIG. 9 is a perspective view of the separated state of the power transmission shaft according to another embodiment.
Figure 13:
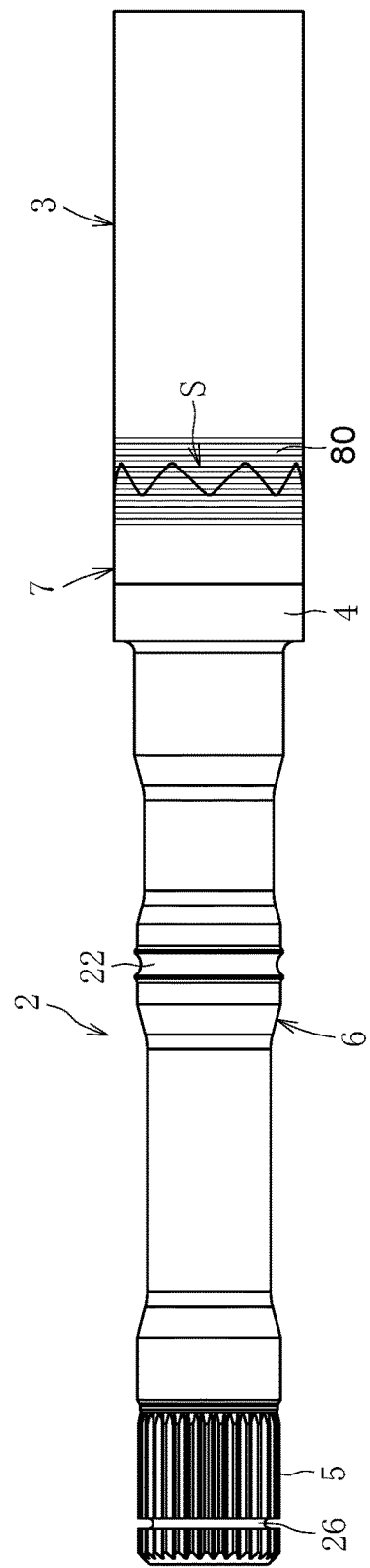
FIG. 13 is a plan view of the power transmission shaft in which a fiber body impregnated with a resin is wound around the meshing portion.

In FIG. 6, a sheet material 17 impregnated with a resin is wound around the meshing portion S between the triangular portions 8 of the corrugated portion forming member 7 and the triangular portions 10 of the shaft auxiliary body 3 in place of the collar member 16. In this case, in the same manner as in the fibers of the shaft auxiliary body 3, the fibers comprise A-direction fibers having a fiber orientation angle θ of +45° and B-direction fibers having a fiber orientation angle θ of −45°. In FIG. 7, the fiber orientation direction of the sheet material 17 is set to the circumferential direction. As illustrated in FIG. 13, a fiber body 80 impregnated with a resin may be wound around the meshing portion S in place of the sheet material 17 impregnated with a resin.

Next, in a power transmission shaft illustrated in FIG. 8 to FIG. 11, the outer periphery of the shaft auxiliary body 3 is covered with a protective pipe material 20. In this case, the corrugated portion forming member 7 is integrally connected to the large-diameter portion 4 of the stub shaft 6. Further, the corrugated portion forming member 7 is positioned on a radially inner side unlike the shaft illustrated in FIG. 1 to FIG. 4.

Therefore, a fitting portion 21, with which an end portion 20a of the protective pipe material 20 is fitted, is formed on an outer peripheral side of the corrugated portion forming member 7. Therefore, the triangular corrugated portion 9 of the corrugated portion forming member 7 and the triangular corrugated portion 11 of the shaft auxiliary body 3 are meshed with each other. In this state, the protective pipe material 20 is externally fitted onto the shaft auxiliary body 3.

As the protective pipe material 20, for example, steel for machine structural use typified by C53C and S43C, 10B38 in which quenching depth and strength are increased by adding boron, and the like may be used. Also in this case, it is preferred that the protective pipe material 20 be subjected to thermosetting treatment to ensure strength. However, when the outer diameter dimension of the protective pipe material 20 can be set to be relatively large to ensure strength, the protective pipe material 20 may not be subjected to thermosetting treatment. When the protective pipe material 20 is subjected to hardening treatment, the surface hardness is set to from 52 HRC to 65 HRC.

Under a state in which the fitting portion 21 with which the end portion 20a of the protective pipe material 20 is fitted is formed, an end surface of the end portion 20a is brought into abutment against an end surface of the large-diameter portion 4 of the stub shaft 6, that is, an end surface of the fitting portion 21, and thus the protective pipe material 20 is joined (welded) to the fitting portion 21. In this case, a thickness T4 of the protective pipe material 20, a thickness T1a of the corrugated portion forming member 7, and a thickness T2a of the shaft auxiliary body 3 are set to the same thickness. Specifically, the thicknesses T4, T1a, and T2a are set to from about 5 mm to about 10 mm. Further, the outer diameter dimension D of the large-diameter portion 4 and an outer diameter dimension D4 of the protective pipe material 20 are set to the same dimension, and an outer diameter dimension D1a of the corrugated portion forming member 7 and an outer diameter dimension D2a of the shaft auxiliary body 3 are set to the same dimension.

In the power transmission shaft of the present invention, the torsional strength of the fiber reinforced plastic can be kept at a high level by setting the fiber orientation angle of the fiber reinforced plastic of the shaft auxiliary body 3 to be in the same direction as a direction of stress generated in the hypotenuse of each of the triangular portions 8 and 10 under a torque load state.

Further, the apex portion of the triangular portion 10 forms a triangular shape of from about 60° to about 120°, and the strength based on the shape becomes stable by setting the angle formed by the hypotenuse of each of the triangular portions 8 and 10 of the triangular corrugated portions 9 and 11 with respect to the shaft auxiliary body axial center to from 30° to 60°. That is, when the apex portion has an acute angle of about 60° or less, the apex portion has a so-called tapered shape, and the strength based on the shape does not become stable. In contrast, when the apex portion has an obtuse angle of 120°, the axial length of the meshing portion S becomes small, and a stable torque transmission function is not easily exhibited.

Therefore, according to the present invention, the torsional strength of the fiber reinforced plastic can be kept at a high level, and the strength based on the shape becomes stable. Therefore, it is possible to provide a power transmission shaft, which can be reduced in weight and can effectively exhibit a torque transmission function. In particular, there is an advantage in that the fiber orientation angle is easily set to be in the same direction as the direction of stress generated in the hypotenuses 8a and 10a of each of the triangular portions 8 and 10 under a torque load state by setting the angle formed by the hypotenuses 8a and 10a of each of the triangular portions 8 and 10 of the triangular corrugated portions 9 and 11 with respect to the shaft auxiliary body axial center to 45° and setting the fiber orientation angle of the fiber reinforced plastic of the shaft auxiliary body 3 to ±45°.

When the cored bar 15 is internally fitted into the shaft auxiliary body 3, the shaft auxiliary body 3 can be prevented from being buckled, and the torsional strength is increased. Further, when the collar member 16 or the like is externally fitted onto the meshing portion with which the triangular corrugated portions 9 and 11 are meshed, the meshing portion can be prevented from being enlarged (increased in diameter) toward the radially outer side at a time of torque load. Further, the joint strength can be prevented from decreasing, and a torque transmission function can be exhibited stably over a long time period.

When the fiber reinforced plastic is impregnated with a large number of short fibers, the strength of the fiber reinforced plastic can be increased, and a power transmission shaft that is further excellent in durability can be provided.

When the shaft auxiliary body 3 is covered with the protective pipe material 20, the protective pipe material 20 can serve as a cored bar configured to reinforce the torsional strength on an outer peripheral side of the shaft auxiliary body 3, and the shaft auxiliary body 3 can be protected from foreign matters, for example, flying stone, UV-rays, and the like from outside.

The embodiments of the present invention are described above. However, the present invention is not limited to the above-mentioned embodiments and may be variously modified. In the power transmission shaft illustrated in FIG. 1 to FIG. 4, the cored bar 15 may be omitted as long as the shaft auxiliary body 3, which can be prevented from being buckled and ensure the torsional strength, can be obtained. Further, the fiber reinforced plastic of the shaft auxiliary body 3 may not be impregnated with short fibers.

Figure 10:
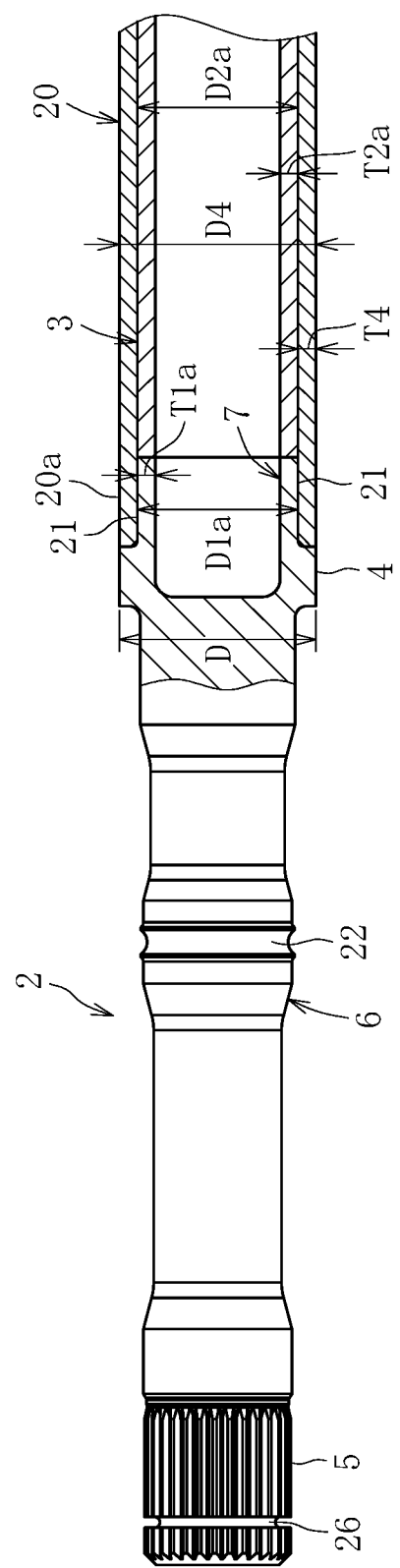
FIG. 10 is a plan view for illustrating a cross-section of relevant parts in an assembled state of the power transmission shaft according to another embodiment.
Figure 11:
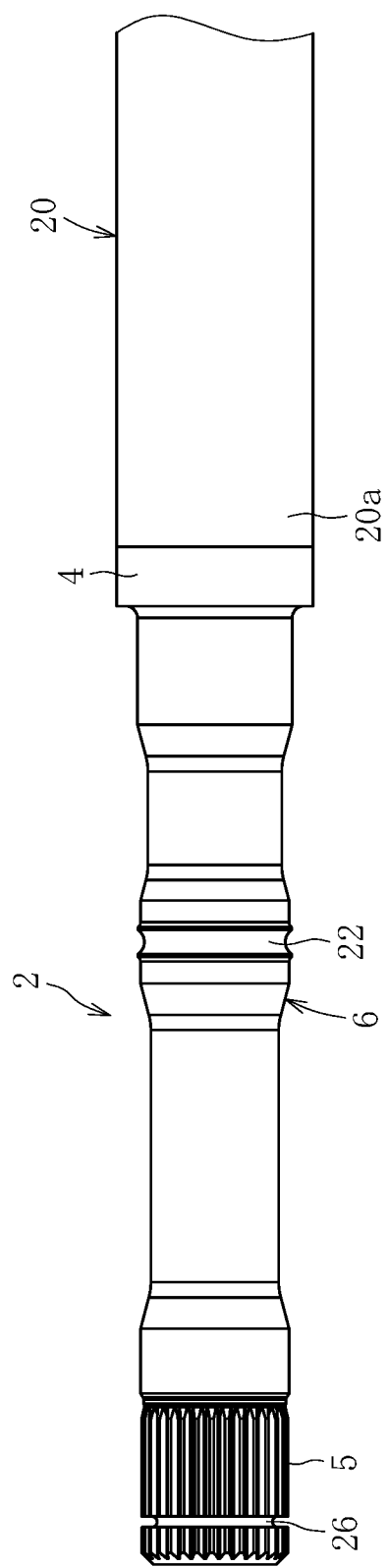
FIG. 11 is a plan view of the assembled state of the power transmission shaft according to another embodiment.

The thickness T of the large-diameter portion 4 of the shaft main body 2, the thickness T1 (T1a) of the corrugated portion forming member 7, the thickness T2 (T2a) of the shaft auxiliary body 3, the thickness T3 of the cored bar 15, the thickness T4 of the protective pipe material 20, and the like may be arbitrarily set, and the outer diameter dimension D of the large-diameter portion 4 of the shaft main body 2, the outer diameter dimension D1 of the triangular corrugated portion 9 of the corrugated portion forming member 7, the outer diameter dimension D2 of the shaft auxiliary body 3, the outer diameter dimension D3 of the cored bar 15, and the like may also be arbitrarily set. That is, in FIG. 3, the thickness T of the large-diameter portion 4, the thickness (T1+T3) of the superimposed portion of the shaft auxiliary body 3 and the corrugated portion forming member 7, and the thickness (T2+T3) of the superimposed portion of the shaft auxiliary body 3 and the cored bar 15 may not be set to the same thickness. In FIG. 10, the thickness T of the large-diameter portion 4, the thickness (T1a+T4) of the superimposed portion of the protective pipe material 20 and the corrugated portion forming member 7, and the thickness (T2a+T4) of the superimposed portion of the shaft auxiliary body 3 and the protective pipe material 20 may not be set to the same thickness.

Further, the number, size, and the like of the triangular portion 10 of the shaft auxiliary body 3 may be arbitrarily set in accordance with the diameter dimension, thickness dimension, and the like of the shaft auxiliary body 3. In the above-mentioned embodiments, the apex portion of each triangular portion 10 includes a round part so as to be rounded, but the apex portion may not be rounded.

When the cored bar 15 or the protective pipe material 20 is joined to the large-diameter portion 4 of the shaft main body, friction joining (friction pressure contact, pressure contact) may be performed instead of welding. The friction joining is a joining method involving causing relative motion in a metal material through contact pressurizing and using generated friction heat as a heat source. Further, when joining is performed through welding, various welding methods, such as electron beam welding, laser welding, arc welding, or gas welding, may be adopted.

Further, in the above-mentioned embodiments, the filament winding method is described as the method of manufacturing the shaft auxiliary body 3 made of fiber reinforced plastic. However, other methods, such as a sheet winding method, may be adopted. Here, the sheet winding method is a method involving winding sheet-shaped fibers impregnated with a resin under a semi-hardened state (prepreg) around an outer side of a rotating mandrel, hardening the fibers, and pulling out the mandrel, to thereby form a pipe shape.

As the fiber reinforced plastic, for example, a glass fiber reinforced plastic (GFRP) or a carbon fiber reinforced plastic (CFRP) may be used, and a boron fiber reinforced plastic (BFRP), an aramid fiber reinforced plastic (AFRP or KFRP), or a polyethylene fiber reinforced plastic (DFRP) may also be used. In addition, as the short fiber to be impregnated, for example, a glass fiber or a carbon fiber may be used, and a carbon nanotube (CNT) or a cellulose nanofiber (CNF) may also be used.

INDUSTRIAL APPLICABILITY

The fixed type constant velocity universal joint may be a Barfield-type constant velocity universal joint or a fixed type undercut-free constant velocity universal joint, and the plunging type constant velocity universal joint may be a tripod type constant velocity universal joint, a double-offset constant velocity universal joint, or a cross-groove constant velocity universal joint. Further, the power transmission shaft maybe used as a drive shaft or a propeller shaft. When the tripod type constant velocity universal joint is used as the plunging type constant velocity universal joint, a single roller type or a double roller type may be used.

REFERENCE SIGNS LIST

S meshing portion
2 metallic shaft main body
3 shaft auxiliary body
7 corrugated portion forming member
8, 10 triangular portion
9, 11 triangular corrugated portion
15 cored bar
16 collar member
17 sheet material
20 protective pipe material

The invention claimed is:
1. A power transmission shaft comprising:
a metallic shaft main body; and a shaft auxiliary body made of fiber reinforced plastic connected to the metallic shaft main body, the fiber reinforced plastic of the shaft auxiliary body including a plurality of fibers having orientation, wherein one end edge portion of the metallic shaft main body has a triangular corrugated portion including a plurality of triangular portions arranged in a circumferential direction of the power transmission shaft, wherein an end edge portion of the shaft auxiliary body on a metallic shaft main body side has a triangular corrugated portion including a plurality of triangular portions arranged in the circumferential direction, wherein the metallic shaft main body and the shaft auxiliary body are integrated by being linearly arranged by way of meshing that brings a side of the triangular corrugated portion of the shaft auxiliary body on the metallic shaft main body side and a side of the triangular corrugated portion of the metallic shaft main body on a shaft auxiliary body side into contact with each other under a state in which the one end edge portion of the metallic shaft main body and the end edge portion of the shaft auxiliary body on the metallic shaft main body side are brought into abutment against each other, wherein a fiber orientation angle of the fiber reinforced plastic of the shaft auxiliary body is set in the same direction as a direction of stress generated in a hypotenuse of each of the triangular portions of the shaft auxiliary body under a torque load state, and wherein an apex portion of each of the triangular portions of the triangular corrugated portion of the shaft auxiliary body includes a round part, an angle formed by the hypotenuse of each of the triangular portions of the triangular corrugated portion of the shaft auxiliary body with respect to a shaft auxiliary body axial center is set to from 30° to 60°, an angle formed by each of the triangular portions of the triangular corrugated portion of the shaft auxiliary body is set to from 60° to 120°, and the fiber orientation angle of the fiber reinforced plastic of the shaft auxiliary body is the same as the angle of the hypotenuse of each of the triangular portions of the triangular corrugated portion of the shaft auxiliary body and a fiber orientation angle that is orthogonal to the angle of the hypotenuse of each of the triangular portions of the triangular corrugated portion of the shaft auxiliary body.

2. The power transmission shaft according to claim 1, further comprising a cored bar internally fitted into the shaft auxiliary body, the cored bar being joined to the metallic shaft main body.

3. The power transmission shaft according to claim 2, further comprising a ring-shaped collar member externally fitted onto a meshing portion configured by way of meshing that brings the side of the triangular corrugated portion on the metallic shaft main body side and the side of the triangular corrugated portion on the shaft auxiliary body side into contact with each other.

4. The power transmission shaft according to claim 3, wherein the fiber reinforced plastic of the shaft auxiliary body is impregnated with a plurality of short fibers.

5. The power transmission shaft according to claim 2, further comprising a sheet material including fibers impregnated with a resin wound around a meshing portion configured by way of meshing that brings the side of the triangular corrugated portion on the metallic shaft main body side and the side of the triangular corrugated portion on the shaft auxiliary body side into contact with each other.

6. The power transmission shaft according to claim 5, wherein the fiber reinforced plastic of the shaft auxiliary body is impregnated with a plurality of short fibers.

7. The power transmission shaft according to claim 2, further comprising a fiber body impregnated with a resin wound around a meshing portion configured by way of meshing that brings the side of the triangular corrugated portion on the metallic shaft main body side and the side of the triangular corrugated portion on the shaft auxiliary body side into contact with each other.

8. The power transmission shaft according to claim 7, wherein the fiber reinforced plastic of the shaft auxiliary body is impregnated with a plurality of short fibers.

9. The power transmission shaft according to claim 2, wherein the fiber reinforced plastic of the shaft auxiliary body is impregnated with a plurality of short fibers.

10. The power transmission shaft according to claim 1, further comprising a ring-shaped collar member externally fitted onto a meshing portion configured by way of meshing that brings the side of the triangular corrugated portion on the metallic shaft main body side and the side of the triangular corrugated portion on the shaft auxiliary body side into contact with each other.

11. The power transmission shaft according to claim 10, wherein the fiber reinforced plastic of the shaft auxiliary body is impregnated with a plurality of short fibers.

12. The power transmission shaft according to claim 1, further comprising a sheet material including fibers impregnated with a resin wound around a meshing portion configured by way of meshing that brings the side of the triangular corrugated portion on the metallic shaft main body side and the side of the triangular corrugated portion on the shaft auxiliary body side into contact with each other.

13. The power transmission shaft according to claim 12, wherein the fiber reinforced plastic of the shaft auxiliary body is impregnated with a plurality of short fibers.

14. The power transmission shaft according to claim 1, further comprising a fiber body impregnated with a resin wound around a meshing portion configured by way of meshing that brings the side of the triangular corrugated portion on the metallic shaft main body side and the side of the triangular corrugated portion on the shaft auxiliary body side into contact with each other.

15. The power transmission shaft according to claim 14, wherein the fiber reinforced plastic of the shaft auxiliary body is impregnated with a plurality of short fibers.

16. The power transmission shaft according to claim 1, wherein the fiber reinforced plastic of the shaft auxiliary body is impregnated with a plurality of short fibers.

17. The power transmission shaft according to claim 1, further comprising a protective pipe material,
wherein the metallic shaft main body comprises a corrugated portion forming member configured to form the triangular corrugated portion at the one end edge portion, and
wherein the protective pipe material covers the corrugated portion forming member, a meshing portion with which the triangular corrugated portions are meshed, and the shaft auxiliary body.

* * * * *